(12) United States Patent
Ohkawa (10) Patent No.: US 6,447,177 B1
(45) Date of Patent: Sep. 10, 2002

(54) SPOOL LOCK MEMBER AND PHOTO FILM CASSETTE HAVING THE SAME

(75) Inventor: Norio Ohkawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 21 days.

(21) Appl. No.: 09/663,377

(22) Filed: Sep. 15, 2000

(30) Foreign Application Priority Data

Sep. 29, 1999 (JP) .......................................... 11-277226

(51) Int. Cl.[7] ............................................... G03B 17/26
(52) U.S. Cl. ....................................................... 396/514
(58) Field of Search ................................ 396/512, 513, 396/514, 516

(56) References Cited

U.S. PATENT DOCUMENTS

| | | | |
|---|---|---|---|
| 5,317,355 A | 5/1994 | Zander et al. ............... 354/277 |
| 5,625,855 A | 4/1997 | Takatori ..................... 396/513 |
| 5,740,487 A | * 4/1998 | Takatori et al. ............. 396/514 |
| 5,740,977 A | * 4/1998 | Kaya ......................... 396/514 |
| 5,893,000 A | * 4/1999 | Iwai et al. .................. 396/514 |
| 5,971,312 A | * 10/1999 | Takatori et al. ............. 396/514 |

* cited by examiner

Primary Examiner—Christopher Mahoney
(74) Attorney, Agent, or Firm—Sughrue Mion, PLLC (57) ABSTRACT

A photo film cassette includes a spool lock member, which prevents a spool from rotating when a rotatable cassette shutter for a photo film passageway is in a closed position. The spool lock member includes a base portion. A first arm extends from the base portion toward the cassette shutter, and shifts in a first direction in response to rotation of the cassette shutter toward the closed position. A second arm extends from the base portion toward the spool, and blocks rotation of the spool by shifting in the first direction with the first arm. The first and second arms have respectively first and second end portions opposite to the base portion. The first and second end portions have a greater width or thickness than an interval between the first and second arms, and are prevented from accidental entry between the first and second arms of another spool lock member before being assembled.

18 Claims, 9 Drawing Sheets

SPOOL LOCK MEMBER AND PHOTO FILM CASSETTE HAVING THE SAME

BACKGROUND OF THE INVENTION

1. Field of the Invention

The present invention relates to a spool lock member and a photo film cassette having the same. More particularly, the present invention relates to a spool lock member for a photo film cassette, capable of reliably locking a spool, and the photo film cassette having the same.

2. Description Related to the Prior Art

A photo film cassette of the IX240 type is characterized in that a leader of a photo film is advanced to the outside of the cassette shell. As disclosed in U.S. Pat. No. 5,317,355, the photo film cassette includes a structure for shielding ambient light, an indicator mechanism, a spool lock mechanism and the like.

The indicator mechanism indicates a status of the photo film in the outside of the photo film cassette among four statuses of being unexposed, partially exposed, exposed and developed. The indicator mechanism includes four windows shaped differently and an indicator plate portion. The windows are formed in one end wall of the photo film cassette, and have shapes of a circle, a letter D, a cross and a square. The indicator plate portion has a color different from the photo film cassette. A spool is provided with the indicator plate portion, and rotatable together. A camera or a video printer, which is for use with the photo film cassette, effects a control of rotationally stopping the spool in a suitable position. The spool is stopped in such a position that the indicator plate portion is positioned behind one of the windows associated with the particular present status of the photo film.

To shield ambient light, a cassette shutter is disposed in a photo film passageway in an openable manner. The cassette shutter rotates between closed and open positions, and when in the closed position, blocks ambient light through the photo film passageway, and when in the open position, allows the photo film to pass the photo film passageway. The camera has a drive shaft, which is engaged with the cassette shutter and rotates the same when the camera loaded with the photo film cassette.

The spool lock mechanism includes a spool lock member and a toothed wheel portion formed with the spool. The spool lock member includes first and second spring arms extending in a V-shape, and is shiftable between a locked position and an unlocked position, and when in the locked position, blocks rotation of the spool, and when in the unlocked position, allows the spool to rotate. The first arm has a shutter engaging end portion. When the cassette shutter is in the closed position, the shutter engaging end portion is pushed by a cam portion of the cassette shutter. When the cassette shutter is in the open position, the shutter engaging end portion is released from the cam portion of the cassette shutter. An end of the second arm has a positioning click claw. A middle portion of the second arm has a spool lock projection.

When the spool lock member is in the unlocked position, the positioning click claw becomes engaged with a claw receiving click projection formed on an inner surface of the photo film cassette to retain the spool lock member in the unlocked position. The spool lock projection, when the spool lock member is in the locked position, comes into a rotational orbit of the toothed wheel portion, and when the spool lock member is in the unlocked position, comes out of the rotational orbit of the toothed wheel portion.

In the first arm, the shutter engaging end portion is pushed by the cassette shutter when the cassette shutter is rotated to the closed position. The first arm is resiliently deformed toward the second arm. In the spool lock member, the first arm is deformed to shift the second arm in a direction away from the first arm. The positioning click claw is moved past the claw receiving click projection to shift the spool lock member to the locked position. Even when the spool lock member is shifted to the locked position, the shutter engaging end portion is still pushed by the cam portion of the cassette shutter. The second arm remains biased to press the spool lock projection to an interdental spaces between the toothed wheel portion. Thus, rotation of the spool is blocked firmly.

In the photo film cassette mentioned above, it is likely that the indicator plate portion indicates an erroneous status even while the spool lock member is in the locked position. This is because the stopped position of the spool is accidentally changed by application of rotational force to the spool upon shock, vibration or inadvertent manual touch. If the spool is rotated while locked, one of teeth of the toothed wheel portion pushes the spool lock projection to shift the second arm toward the first arm. The first arm does not move, as the shutter engaging end portion remains pushed by the cam portion of the cassette shutter. In contrast, the second arm is deformed resiliently as much as the space defined between it and the first arm. Thus, the tooth of the toothed wheel portion is moved past the spool lock projection.

In a process for mounting the spool lock member into the spool, an automatic assembling device is used. The use of the automatic assembling device requires automation of supply of the spool lock member. In a station upstream from the automatic assembling device, the spool lock member should be regularly oriented, and fed one by one.

An example of the supply device is a part feeder for feeding parts one after another in an regulated orientation by applying vibration to those collected irregularly. The part feeder includes a vibrating bucket into which a great number of parts are entered.

If a great number of spool lock members described above are entered in the vibrating bucket, it is likely that the spool lock members are entangled with one another in the vibrating bucket due to the V-shape with the first and second arms. There occurs failure in supply of the spool lock members one after another.

SUMMARY OF THE INVENTION

In view of the foregoing problems, an object of the present invention is to provide a spool lock member for a photo film cassette, which can be manufactured efficiently in an automated system, and the photo film cassette having the same.

Another object of the present invention is to provide a spool lock member for a photo film cassette, capable of locking a spool tightly and firmly, and the photo film cassette having the same.

In order to achieve the above and other objects and advantages of this invention, a spool lock member is incorporated in a photo film cassette, and prevents a spool from rotating when a rotatable cassette shutter for a photo film passageway is in a closed position. In the spool lock member, there is a base portion. A first arm extends from the base portion toward the cassette shutter, for shifting in a first direction in response to rotation of the cassette shutter toward the closed position. A second arm extends from the base portion toward the spool, for blocking rotation of the spool by shifting in the first direction with the first arm. The first and second arms have respectively first and second end portions opposite to the base portion, having a greater width or thickness than an interval between the first and second arms, and prevented from accidental entry between the first and second arms of another spool lock member before being assembled.

In a preferred embodiment, the photo film cassette is IX240 type.

The photo film cassette includes a toothed wheel portion formed with the spool. Furthermore, a spool lock projection is formed with the second arm, meshed with the toothed wheel portion upon shifting in the first direction, for blocking rotation thereof, the spool lock projection being pushed by and separated from the toothed wheel portion in a second direction opposite to the first direction upon application of rotating torque to the spool while the cassette shutter is in an open position. A regulator projection is formed with one of the first and second arms to project toward remainder thereof, for preventing the second arm from coming nearer to the first arm than a predetermined position, to keep the spool lock projection in mesh with the toothed wheel portion even upon application of high rotating torque to the spool while the cassette shutter is in the closed position.

The photo film cassette includes a cam portion, formed with the cassette shutter, having a diameter increasing with respect to an axial direction thereof, for pushing the first end portion in the first direction when the cassette shutter is rotated to the closed position.

The photo film cassette includes a roll chamber for containing a middle portion of the spool and a roll of photo film. A lock chamber is disposed beside the roll chamber, the spool and the cassette shutter extending into the lock chamber, the lock chamber containing the toothed wheel portion and the cam portion. The spool lock member is contained in the lock chamber.

The photo film cassette includes an advancing mechanism for advancing the photo film to an outside of the photo film passageway when the spool is rotated.

The regulator projection is formed with the second arm.

The photo film cassette includes a support portion, formed with an inside thereof, for supporting the base portion, to keep the first and second arms shiftable.

The second arm includes a first partial arm having the spool lock projection. A second partial arm extends from the first partial arm in a direction opposite to the base portion. A positioning claw is formed with an end of the second partial arm, for constituting the second end portion. The photo film cassette includes a claw receiving portion for retaining the positioning claw in a first retaining position when the second arm shifts in the first direction, to keep the spool lock projection in mesh with the toothed wheel portion, and for retaining the positioning claw in a second retaining position when the second arm shifts in the second direction, to keep the spool lock projection disengaged from the toothed wheel portion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
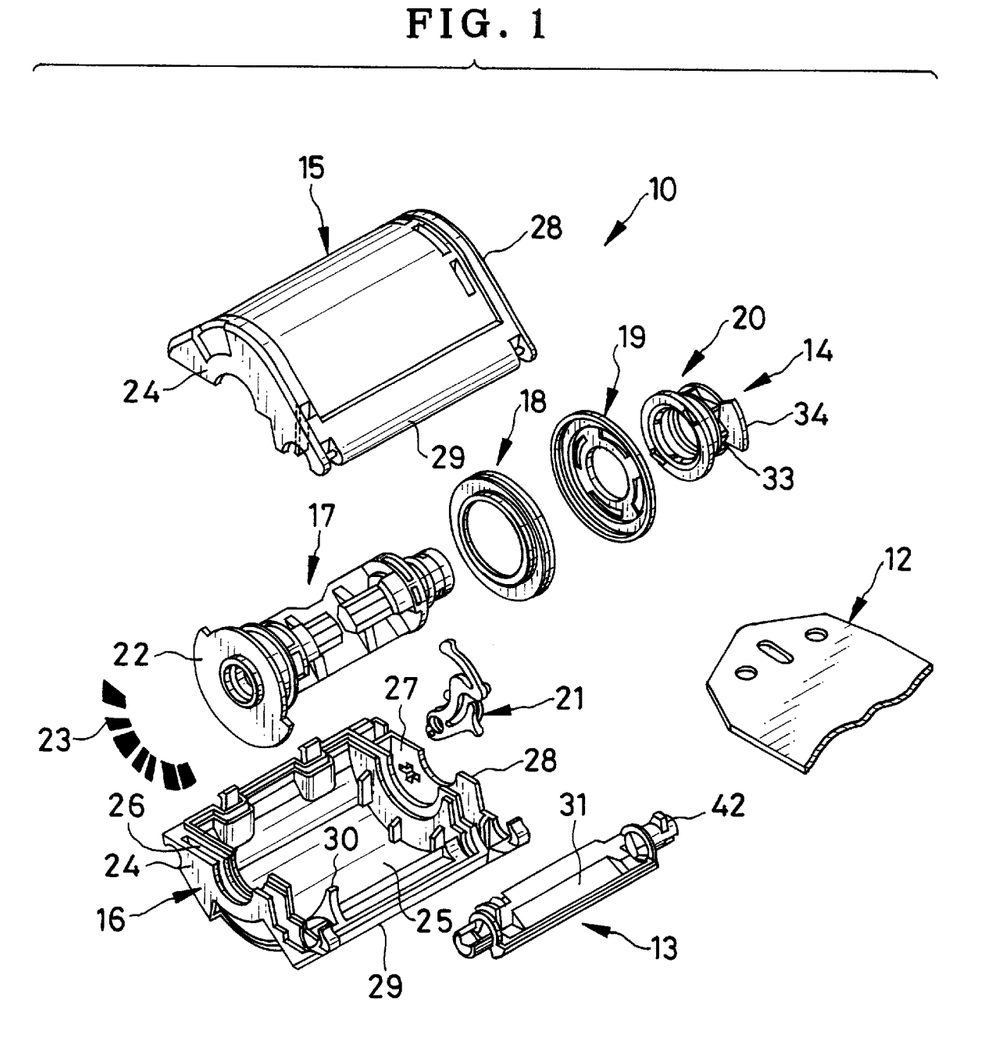
FIG. 1 is an exploded perspective illustrating a photo film cassette.

In FIG. 1, a photo film cassette 10 of the IX240 type includes a cassette shell 11, a photo film 12, a cassette shutter 13, a spool 14 and a spool lock member 21. The cassette shell 11 is constituted by a pair of shell halves 15 and 16. The spool 14 is a combined element including a spool core 17, a pair of flanges 18 and 19, an indicator member 20 and the like. An information plate 22 is formed with the spool core 17. A rotary bar code 23 is printed to the information plate 22, and represents information including photo film sensitivity, the number of exposures and the like. The cassette shell 11 has an end wall 24, through which the rotary bar code 23 is accessed and read by a reader in a camera.

There are three chambers arranged in the axial direction of the spool core 17 in the cassette shell 11. Those include a roll chamber 25, disposed in the center, for containing a roll of the photo film 12. An information plate chamber 26 contains the information plate 22. A lock chamber 27 contains the spool lock member 21 and the indicator member 20.

The spool core 17 extends to come through all the three chambers 25–27 in the cassette shell 11. Ends of the spool core 17 are uncovered in the end wall 24 and another end wall 28 of the cassette shell 11. The flanges 18 and 19 are positioned at an interval on the spool core 17 in the roll chamber 25, where the photo film 12 is wound between the flanges 18 and 19.

Figure 2A:
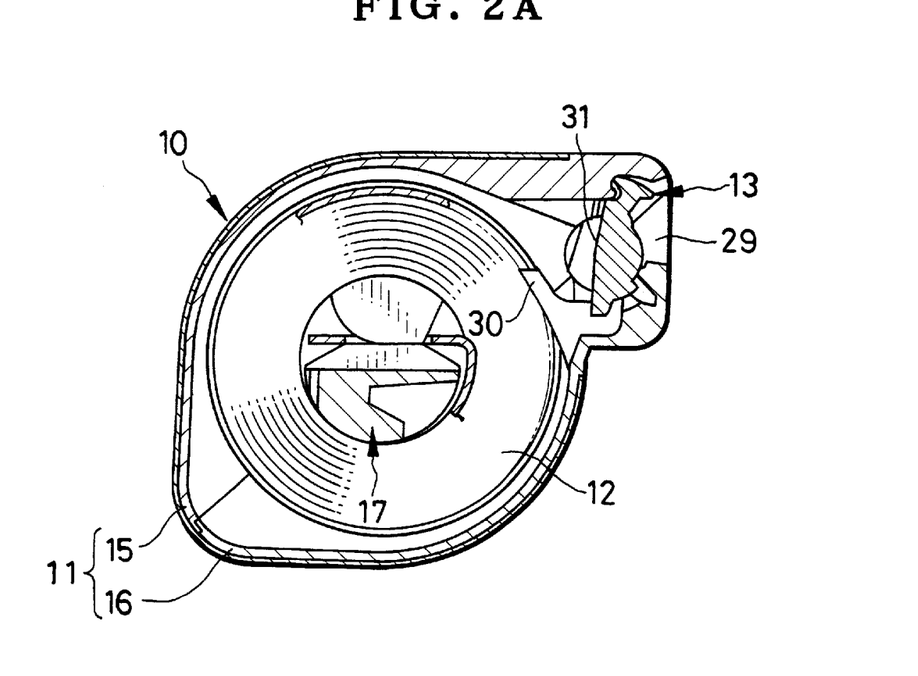
FIG. 2A is a cross section illustrating the photo film cassette.
Figure 2B:
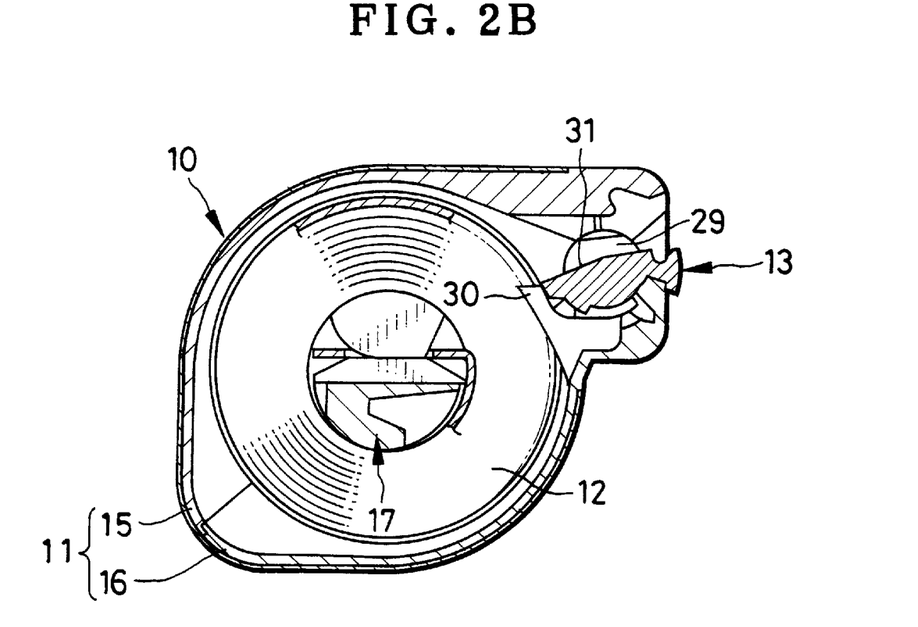
FIG. 2B is a cross section illustrating the photo film cassette in which a cassette shutter is open.

A photo film passageway 29 is defined between the shell halves 15 and 16, communicates to the roll chamber 25, and operates for advancing the photo film 12. The cassette shutter 13 is disposed in the photo film passageway 29, at which a separator claw 30 is formed as a photo film advancing mechanism. Axial ends of the cassette shutter 13 are uncovered in the end walls of the cassette. A camera for use with the present photo film cassette has a drive shaft, with which one of the axial ends is connected to be rotated. A cassette shutter plate 31 is included in the cassette shutter 13, and positioned at the photo film passageway 29. As depicted in FIGS. 2A and 2B, the cassette shutter 13 is rotated between a closed position where the cassette shutter plate 31 closes the photo film passageway 29 and an open position where the cassette shutter plate 31 opens the photo film passageway 29. The separator claw 30 separates a leader of the photo film from the photo film roll when the spool core 17 is rotated in the unwinding direction with the cassette shutter 13 kept in the open position, and directs it to the photo film passageway 29.

Figure 3:
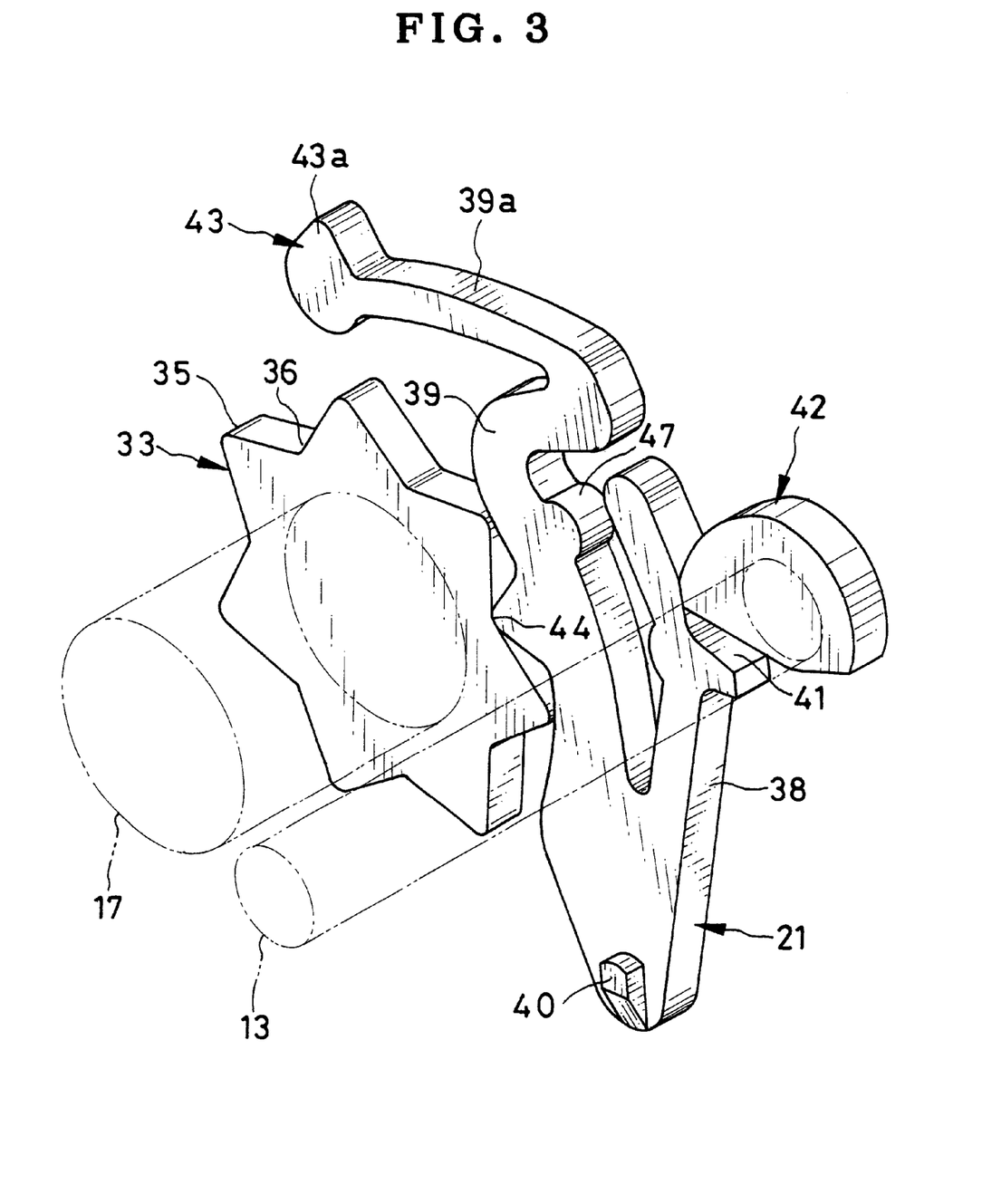
FIG. 3 is a perspective illustrating a spool lock member, a cam portion and a toothed wheel portion.

The indicator member 20 is secured to the spool core 17 in the lock chamber 27, includes a toothed wheel portion 33 and an indicator plate portion 34 in a sectorial shape, and rotates together with the spool core 17. The indicator plate portion 34 rotates behind plural indicator windows formed in the end wall 28 of the cassette shell 11. When the spool core 17 is stopped, the indicator plate portion 34 is positioned behind a particular one of the indicator windows indicating the present status of the photo film. In FIG. 3, the toothed wheel portion 33 includes teeth 35 defined by surfaces with a small inclination, and interdental spaces 36 between the teeth 35.

The spool lock member 21 is supported movably on an inner surface of the shell half 16 inside the lock chamber 27. The spool lock member 21 is movable between a locked position of FIG. 4 for blocking rotation of the spool core 17 upon closing of the cassette shutter 13, and an unlocked position of FIG. 5 for allowing the spool core 17 to rotate.

The spool lock member 21 is a single piece and consists of first and second arms 38 and 39 combined in a V-shape. Each of the first and second arms 38 and 39 is a spring with resiliency. A base portion 40 is an end common to the first and second arms 38 and 39, is supported by a support portion 16a inside the shell half 16 in a pivotally movable manner. An open space between the first and second arms 38 and 39 is disposed between the cassette shutter 13 and the spool core 17.

In the first arm 38 is formed a first end portion 41 having an L-shape and operating as a cam follower. An inner part of the L-shape of the first end portion 41 is oriented close to the cassette shutter 13. A cam portion 42 is formed with the cassette shutter 13, is disposed in the lock chamber 27, and has an eccentric shape. When the cassette shutter 13 is in the closed position, the cam portion 42 enters the inner part of the first end portion 41 and pushes the same toward the second arm 39. When the cassette shutter 13 is in the open position, the cam portion 42 is away from the first end portion 41 to keep the first end portion 41 free.

The second arm 39 includes a resilient partial arm 39a and a spool lock projection 44. The spool lock projection 44 is formed between the resilient partial arm 39a and the base portion 40 provided with the second arm 39. The resilient partial arm 39a in the second arm 39 extends away from the first arm 38. A second end portion 43 of the resilient partial arm 39a is deformable up and down between the spool core 17 and the shell half 15.

Figure 4:
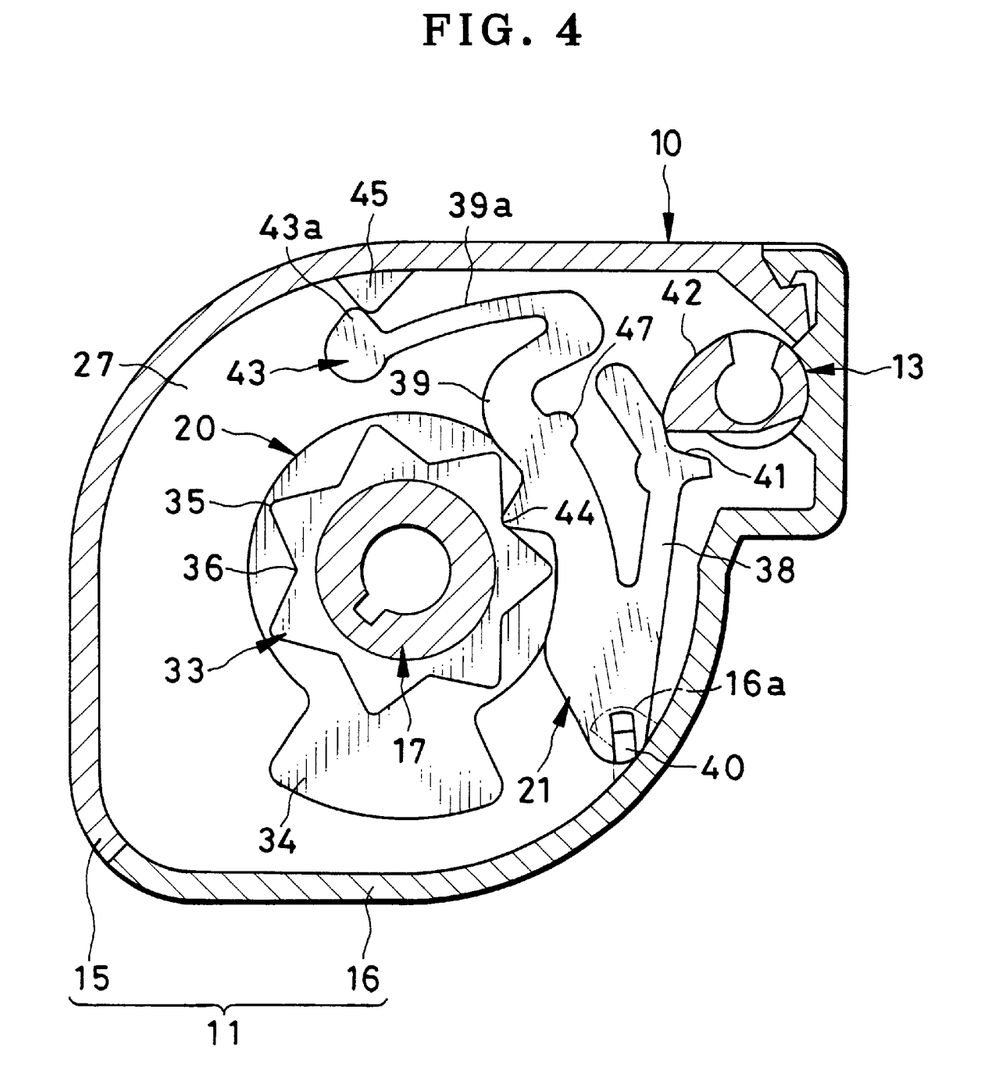
FIG. 4 is a cross section illustrating a lock chamber of the photo film cassette in which a photo film passageway is closed and a spool is locked.
Figure 5:
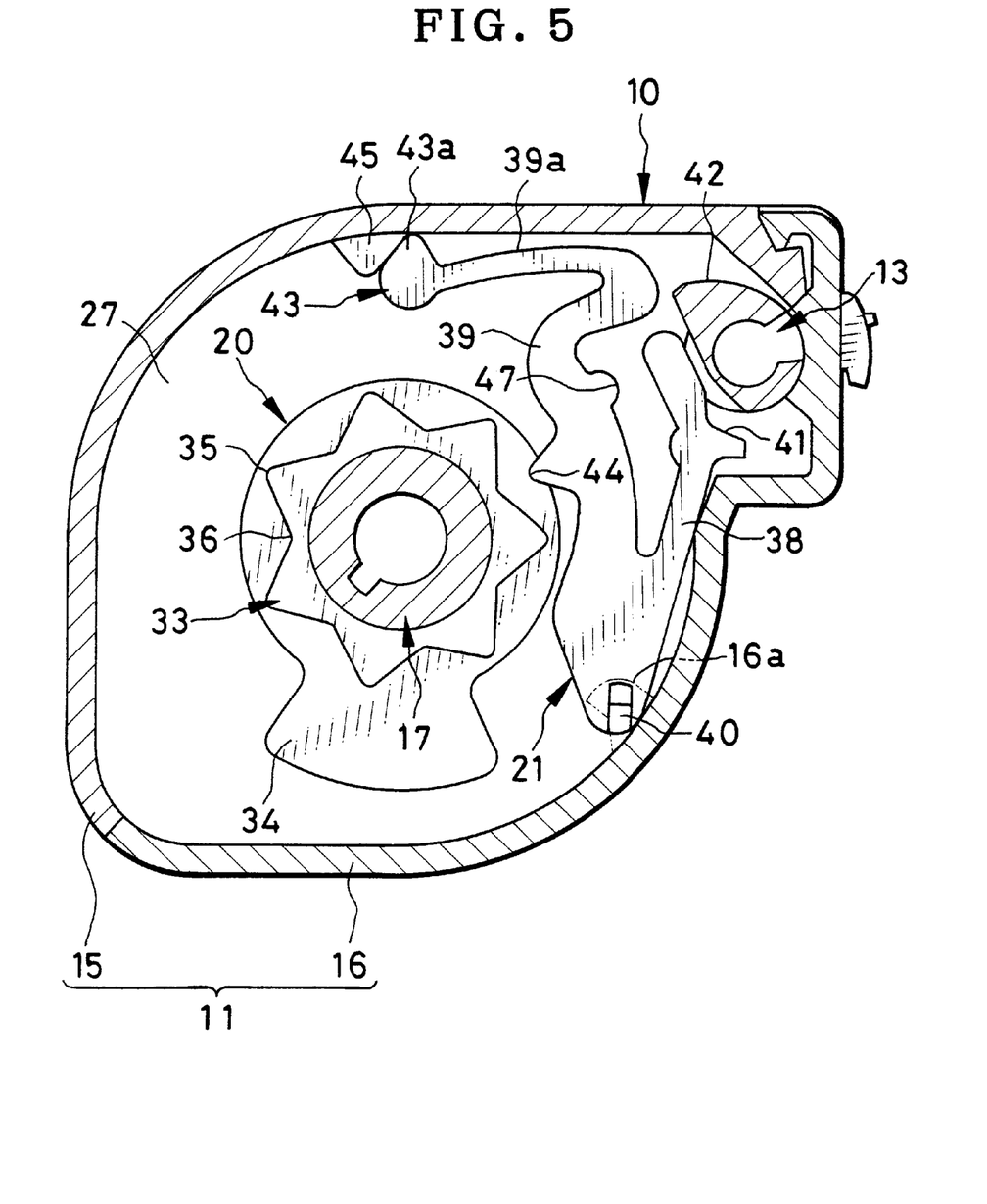
FIG. 5 is a cross section illustrating the lock chamber of the photo film cassette in which the photo film passageway is open and the spool is unlocked.

In the second arm 39, the second end portion 43 with a positioning claw is located as an end of the resilient partial arm 39a, and directed toward the inner surface of the shell half 15. A claw receiving portion 45 with a projection is formed inside the shell half 15. The second end portion 43, when the spool lock member 21 is in the unlocked position, is engaged with the claw receiving portion 45, and keeps the spool lock member 21 stably in the unlocked position. The spool lock projection 44 projects toward the spool core 17. When the spool lock member 21 is in the locked position, the spool lock projection 44 enters the rotational orbit of the toothed wheel portion 33. When the spool lock member 21 is in the unlocked position, the spool lock projection 44 comes out of the rotational orbit of the toothed wheel portion 33.

When the cassette shutter 13 is rotated toward the closed position, the first end portion 41 in the first arm 38 is pushed by the cam portion 42 and deformed toward the second arm 39. By the deformation of the first arm 38, the second arm 39 is biased in a direction away from the first arm 38, so that the second end portion 43 of the second arm 39 is moved past the claw receiving portion 45. Thus, the spool lock member 21 moves to the locked position. Then the spool lock projection 44 comes into a rotational orbit of the toothed wheel portion 33. The spool core 17 has been stopped in such a rotational position that one of the interdental spaces 36 is oriented to receive the spool lock projection 44. Accordingly, the spool lock projection 44 becomes engaged with the one of the interdental spaces 36. The spool core 17 becomes kept from rotating, because the spool lock projection 44 firmly stops the teeth 35 from rotating.

When the cassette shutter 13 is rotated to the open position, the first end portion 41 becomes free. A drive shaft of a camera rotates the spool core 17. In an initial step of the rotation, the spool lock projection 44 is pushed by one of the teeth 35 of the toothed wheel portion 33 to shift the second arm 39 toward the first arm 38. The force of the push to the spool lock projection 44 moves the second end portion 43 past the claw receiving portion 45. Thus, the spool lock member 21 is shifted to the unlocked position and kept positioned. The spool lock projection 44 is now located outside the rotational orbit of the toothed wheel portion 33. Accordingly, the spool core 17 can rotate further in a smooth manner.

A regulator projection 47 is formed with the second arm 39 to project toward the first arm 38. The regulator projection 47 has an arc shape and is directed opposite to the spool lock projection 44, and restrains a range of resilient deformation of the second arm 39 toward the first arm 38 to prevent the teeth 35 from moving past the spool lock projection 44 when the spool lock member 21 is in the locked position. The regulator projection 47 has such a height of protrusion that, if the second arm 39 is deformed toward the first arm 38 by force applied by one of the teeth 35 to the spool lock projection 44, the regulator projection 47 comes in contact with the first arm 38 before movement of one of the teeth 35 past the spool lock projection 44.

When the cassette shutter 13 is in the closed position, the spool lock member 21 is in the locked position as illustrated in FIG. 4. The spool lock projection 44 is now located in a position for mesh with the toothed wheel portion 33. The first arm 38 is biased or shifted toward the second arm 39 by the push of the cam portion 42 toward the first end portion 41. Thus the second arm 39 is biased or shifted in a direction away from the first arm 38. The spool lock projection 44 becomes engaged with one of the interdental spaces 36 to block rotation of the spool core 17.

Figure 6:
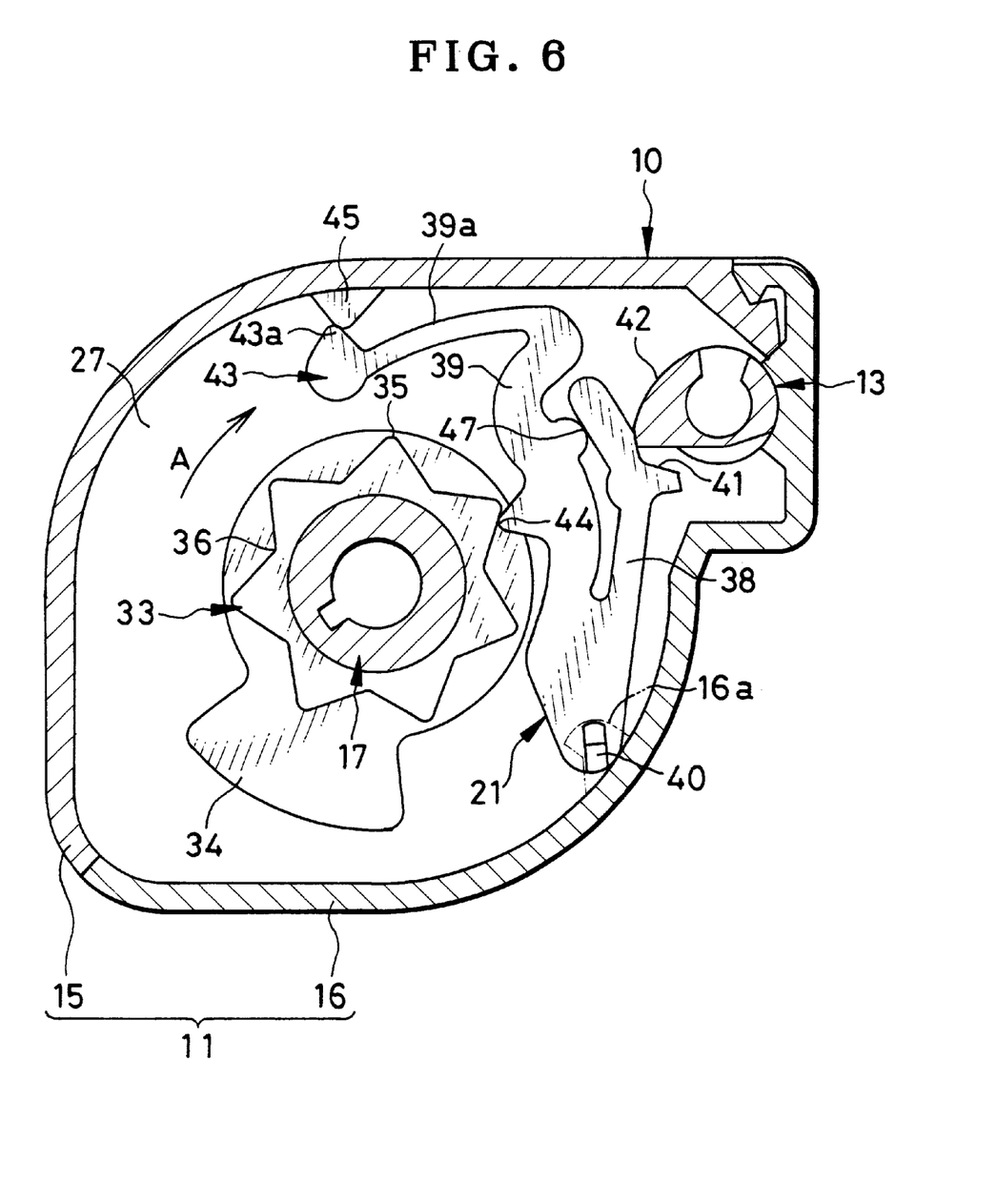
FIG. 6 is a cross section illustrating the lock chamber of the photo film cassette in which the photo film passageway is closed but the spool receives rotational force.

When the rotational force of bias is applied to the spool core 17 in the unwinding direction A in FIG. 6, one of the teeth 35 pushes the spool lock projection 44 to bias the second arm 39 toward the first arm 38. There is no deformation in the first arm 38 because the first end portion 41 is pushed by the cam portion 42. In contrast, the second arm 39 is deformed resiliently at an amount of the open space defined with the first arm 38. One of the teeth 35 continues pushing the spool lock projection 44. Before movement of one of the teeth 35 past the spool lock projection 44, the regulator projection 47 comes in contact with the first arm 38 to restrain the resilient deformation of the second arm 39. Thus, there is no further deformation in the second arm 39. It is possible to avoid an error in the stop position of the spool core 17, because one of the teeth 35 can be kept from moving past the spool lock projection 44 accidentally.

It is to be noted that the regulator projection 47 may be formed with the first arm 38 with such a size as to contact the second arm 39 shortly before movement of one of the teeth 35 past the spool lock projection 44. Furthermore, a regulator projection may be formed to project from a position between the resilient partial arm 39a and a partial arm having the spool lock projection 44 toward a position between the first and second arms 38 and 39, namely in a direction downward as viewed in FIGS. 4–6. Also, the regulator projection 47 may have any suitable shape, for example, an arc shape, quadrilateral shape, triangular shape and the like. The regulator projection 47 may have a hook shape and may be provided with resiliency.

The spool lock member 21 is preferably a plastic piece molded by use of molds. Preferable examples of the resin are thermoplastic as disclosed in U.S. Pat. No. 5,625,855 (corresponding to JP-A 08-179469) in view of mass production and low cost. Also, light-shielding material should be added in consideration of shielding light. An example of the light-shielding material is carbon black, which can be added at a preferable ratio of 0.05–3.00 wt. %. Furthermore, it is possible to add lubricant such as silicone oil, antistatic agent, inorganic or organic pigment such as titanium oxide, processing aid such as zinc stearate, antioxidant, nucleator, plasticizer, and the like to the resin.

Preferred examples of the resin include polystyrene resin, high-impact polystyrene resin (HIPS), styrene acrylonitrile copolymer resin, styrene acrylonitrile butadiene copolymer resin, polypropylene resin, high density polyethylene resin, polyethylene terephthalate resin, polybutylene terephthalate resin, polycarbonate resin, polyvinyl chloride resin, and modified resin of those. In view of ensured dimensional precision, physical strength, ultrasonic weldability and other advantages, one of the most preferred examples is high-impact polystyrene resin (HIPS) containing 0.1–10 wt. % of synthetic rubber, which has a melt flow rate of 1.0–10.0 grams per 10 minutes, preferably 2.0–8.0 grams per 10 minutes, and more preferably 2.5–7 grams per 10 minutes. As other necessary properties of this resin, the modulus in flexure of the resin is preferably 15,000–30,000 $kg/cm^2$, more preferably 18,000–28,000 $kg/cm^2$, and the most preferably 20,000–28,000 $kg/cm^2$. The Vicat softening point (under weight of 15 kg) of the resin is preferably 80° C. or higher, more preferably 85° C. or higher, and the most preferably 90° C. or higher.

Figure 7:
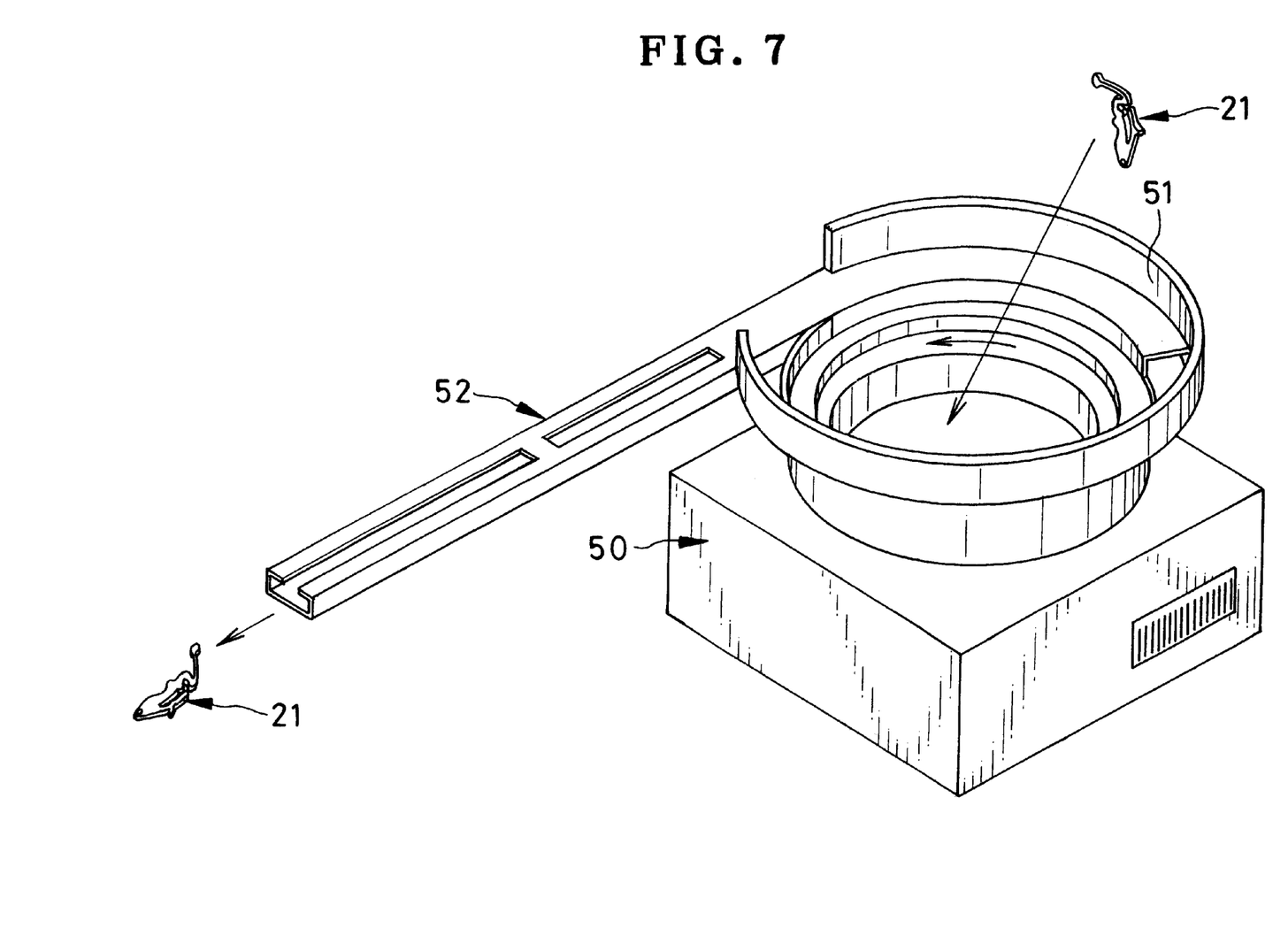
FIG. 7 is an exploded perspective illustrating a part feeder for supplying the spool lock member in the cassette manufacturing process.

Another preferred embodiment is hereinafter described. In FIG. 7, a part feeder 50 is used in a manufacturing process of the photo film cassette 10, and supplied with a great number of the spool lock members 21 for consecutive feeding. The part feeder 50 is connected to an automatic assembling device for mounting each spool lock member 21 into the cassette shell 11. In the part feeder 50, a vibrating bucket 51 receives the spool lock members 21. When the vibrating bucket 51 is caused to vibrate, the spool lock members 21 are rearranged in a regular orientation, and sent out through a conveying path 52 which is downstream from the vibrating bucket 51.

Figure 10:
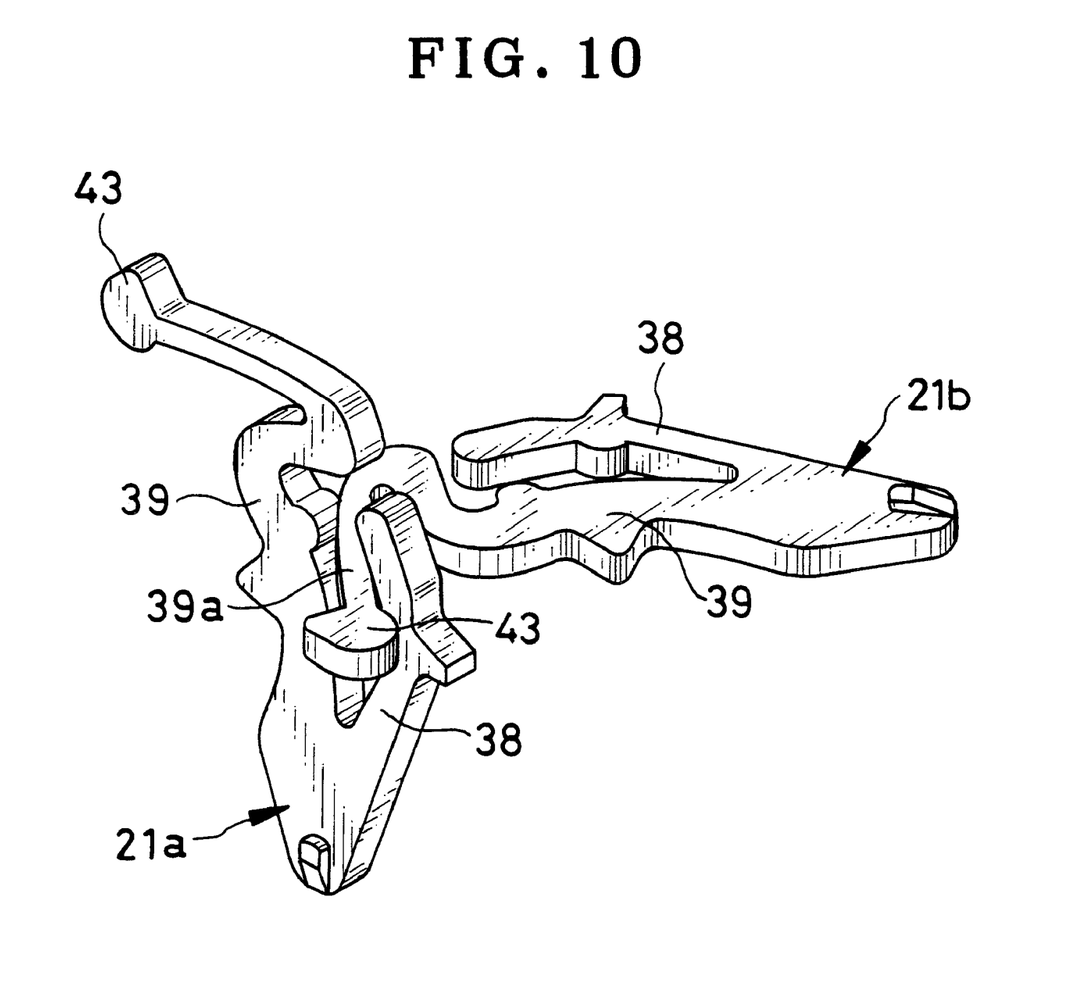
FIG. 10 is a perspective illustrating failure in a process of supply of plural spool lock members.

In the part feeder 50, a problem occurs in that, as illustrated in FIG. 10, one spool lock member 21a may be partially entangled in another spool lock member 21b. In the vibrating bucket 51, the second end portion 43 or the resilient partial arm 39a of the second arm 39 of the spool lock member 21b may be captured in the open space between the first and second arms 38 and 39 of the spool lock member 21a. The spool lock member 21a or 21b cannot be successfully fed.

Figure 8:
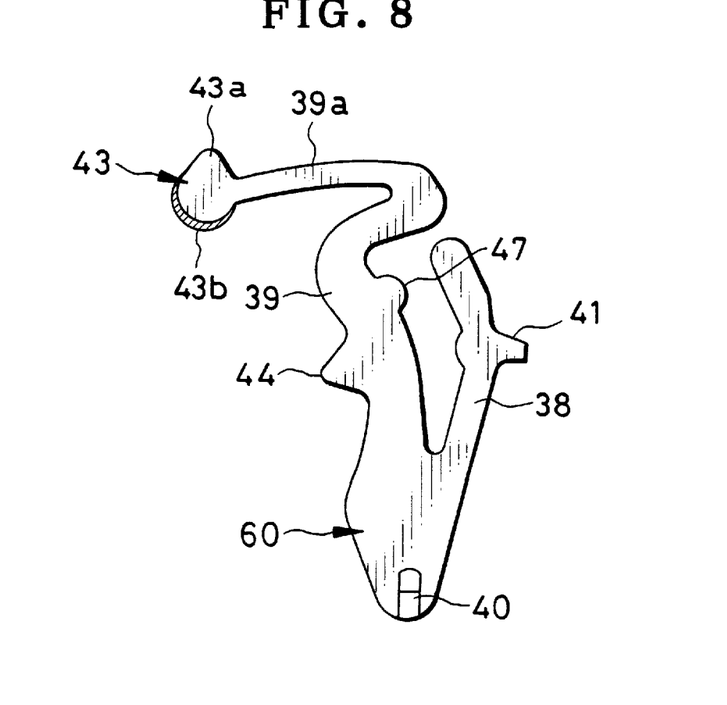
FIG. 8 is a plan illustrating another preferred spool lock member in which an end portion with a positioning claw have a greater width.

A preferred embodiment in FIG. 8 has a spool lock member 60, in which a distal end of the second arm 39 has a greater width so as to be prevented from entering the open space between the first and second arms 38 and 39. As described above, the second end portion 43 is formed with the resilient partial arm 39a. In the second end portion 43, there are a positioning claw 43a and an end thickened part 43b, which is disposed opposite to the positioning claw 43a and has a form thickened in the height direction of the second end portion 43. As the size of the second end portion 43 is determined greater than the interval between the first and second arms 38 and 39, it is possible to avoid entangling a number of the spool lock members 60 with one another. It is to be noted that a thickness of the second end portion 43 can be predetermined greater instead of increasing the size of the second end portion 43 in the height direction. Furthermore, the resilient partial arm 39a may have a greater width or thickness in addition to changing the size of the second end portion 43. In short, at least one of the resilient partial arm 39a and the second end portion 43 in the second arm 39 can have a greater width or thickness according to the present invention.

Figure 9:
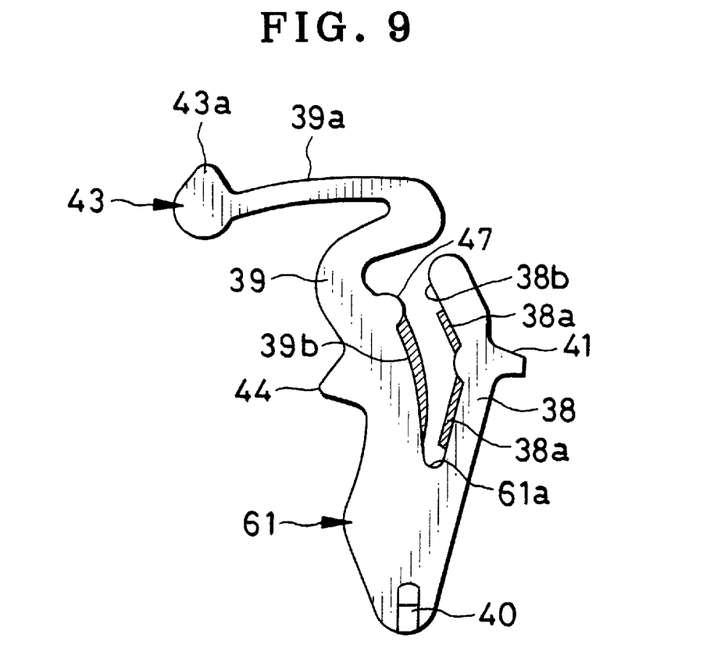
FIG. 9 is a plan illustrating still another preferred spool lock member in which an interval between two arms is reduced.

Another preferred embodiment is depicted in FIG. 9. A spool lock member 61 has an open space which is defined between the first and second arms 38 and 39 and predetermined with such a small width as not to receive the end of the first arm 38. There are middle thickened parts 38a and 39b formed along inner sides of the first and second arms 38 and 39 facing one another. The middle thickened part 38a has a form not extending to a surface 38b which is opposed to the regulator projection 47. The middle thickened part 39b has a form of which a level is lower than that of the regulator projection 47. It is to be noted that no thickened part should be formed at an inner corner 61a close to the base portion 40. This is for the purpose of avoiding increasing in the force required for deforming the first and second arms 38 and 39 even if portions of the first and second arms 38 and 39 are thickened. Furthermore, only one of the middle thickened parts 38a and 39b can be formed in the first and second arms 38 and 39 without forming the remainder.

Also, it is effective to extend an upper end of the first arm 38 upwards as viewed in the drawings, to reduce an interval between it and a right end portion of the resilient partial arm 39a of the second arm 39.

In the above embodiments, the entirety of the first arm is deformable. A section in the second arm 39 between the spool lock projection 44 and the second end portion 43 is deformable. In contrast, a section in the second arm 39 between the base portion 40 and the spool lock projection 44 may be considerably rigid and not easily deformable. However, it is possible to shape only at least one of the first and second arms 38 and 39 in a deformable manner. In the spool lock member 21, 60, 61, it is possible that the first end portion 41 in the first arm 38 is shiftable in a certain manner relative to the spool lock projection 44 in the second arm 39.

Although the present invention has been fully described by way of the preferred embodiments thereof with reference to the accompanying drawings, various changes and modifications will be apparent to those having skill in this field.

Therefore, unless otherwise these changes and modifications depart from the scope of the present invention, they should be construed as included therein.

What is claimed is:

1. A spool lock member incorporated in a photo film cassette, for preventing a spool from rotating when a rotatable cassette shutter is in a closed position to close a photo film passageway, said spool lock member comprising:

a base portion;

a first arm, extending from said base portion toward said cassette shutter, for shifting in a first direction in response to rotation of said cassette shutter toward said closed position;

a second arm, extending from said base portion toward said spool, for blocking rotation of said spool by shifting in said first direction with said first arm;

first and second end portions of respectively said first and second arms, having a greater width or thickness than an interval between said first and second arms, and prevented from accidental entry between said first and second arms of another spool lock member before being assembled.

2. A spool lock member as defined in claim 1, wherein said photo film cassette advances said photo film to an outside of said photo film passageway when said spool is rotated.

3. A spool lock member as defined in claim 2, wherein said photo film cassette is IX240 type.

4. A spool lock member as defined in claim 3, wherein said photo film cassette includes a toothed wheel portion formed with said spool;

further comprising:

a spool lock projection, formed with said second arm, meshed with said toothed wheel portion upon shifting in said first direction, for blocking rotation of said spool, said spool lock projection being pushed by and separated from said toothed wheel portion in a second direction opposite to said first direction upon rotation of said toothed wheel portion with said spool while said cassette shutter is in an open position;

a regulator projection, formed with one of said first and second arms to project toward remainder thereof, for preventing said second arm from coming nearer to said first arm than a predetermined position, to keep said spool lock projection in mesh with said toothed wheel portion even upon application of high rotating torque to said spool while said cassette shutter is in said closed position.

5. A spool lock member as defined in claim 4, further comprising a cam portion, formed with said cassette shutter, for pushing said first end portion in said first direction when said cassette shutter is rotated to said closed position.

6. A spool lock member as defined in claim 5, wherein said regulator projection is formed with said second arm.

7. A spool lock member as defined in claim 6, wherein said photo film cassette includes a support portion for supporting said base portion, to keep said first and second arms shiftable.

8. A spool lock member as defined in claim 7, wherein said second arm includes:

a first partial arm having said spool lock projection;

a second partial arm formed with an end of said first partial arm;

a positioning claw, formed with an end of said second partial arm, for constituting said second end portion;

said photo film cassette includes a claw receiving portion for retaining said positioning claw in a first retaining position when said second arm shifts in said first direction, to keep said spool lock projection in mesh with said toothed wheel portion, and for retaining said positioning claw in a second retaining position when said second arm shifts in said second direction, to keep said spool lock projection disengaged from said toothed wheel portion.

9. A photo film cassette, including a cassette shell having a photo film passageway, a spool, contained in said cassette shell in a rotatable manner, and having photo film wound thereabout in a form of a roll, a rotatable cassette shutter for closing said photo film passageway when in a closed position, and for opening said photo film passageway when in an open position, said photo film cassette comprising:

a spool lock member, contained in said cassette shell, and including:

a base portion;

a first arm, extending from said base portion toward said cassette shutter, for shifting in a first direction in response to rotation of said cassette shutter toward said closed position;

a second arm, extending from said base portion toward said spool, for blocking rotation of said spool by shifting in said first direction with said first arm; and a regulator projection, formed with one of said first and second arms to project toward remainder thereof, for preventing said second arm from coming nearer to said first arm than a predetermined position, to keep said spool retained by said second arm even upon application of high rotating torque to said spool while said cassette shutter is in said closed position.

10. A photo film cassette as defined in claim 9, said photo film cassette being IX240 type, and wherein said photo film is advanced to an outside of said photo film passageway when said spool is rotated.

11. A photo film cassette as defined in claim 10, further comprising:

a toothed wheel portion formed with said spool;

a spool lock projection, formed with said second arm, meshed with said toothed wheel portion upon shifting in said first direction, for blocking rotation of said spool, said spool lock projection being pushed by and separated from said toothed wheel portion in a second direction opposite to said first direction upon rotation of said toothed wheel portion with said spool while said cassette shutter is in said open position.

12. A photo film cassette as defined in claim 11, further comprising a cam portion, formed with said cassette shutter, for pushing said first arm in said first direction when said cassette shutter is rotated to said closed position.

13. A photo film cassette as defined in claim 12, wherein said cassette shell includes:

a roll chamber for containing a middle portion of said spool and said roll of said photo film;

a lock chamber disposed beside said roll chamber, said spool and said cassette shutter extending into said lock chamber, said lock chamber containing said spool lock member, said toothed wheel portion and said cam portion.

14. A photo film cassette as defined in claim 13, wherein said regulator projection is formed with said second arm.

15. A photo film cassette as defined in claim 13, wherein said cassette shell includes a support portion for supporting said base portion, to keep said first and second arms shiftable.

16. A photo film cassette as defined in claim 13, wherein said second arm includes:
- a first partial arm having said spool lock projection;
- a second partial arm formed with an end of said first partial arm;
- a positioning claw formed with an end of said second partial arm;
- said cassette shell includes a claw receiving portion for retaining said positioning claw in a first retaining position when said second arm shifts in said first direction, to keep said spool lock projection in mesh with said toothed wheel portion, and for retaining said positioning claw in a second retaining position when said second arm shifts in said second direction, to keep said spool lock projection disengaged from said toothed wheel portion.

17. A photo film cassette as defined in claim 10, comprising first and second end portions of respectively said first and second arms, having a greater width or thickness than an interval between said first and second arms, and prevented from accidental entry between said first and second arms of another spool lock member before being assembled.

18. A photo film cassette, including a cassette shell having a photo film passageway, a spool, contained in said cassette shell in a rotatable manner, and having photo film wound thereabout in a form of a roll, a rotatable cassette shutter for closing said photo film passageway when in a closed position, and for opening said photo film passageway when in an open position, said photo film cassette comprising:
- a spool lock member, contained in said cassette shell, and including:
- a base portion;
- a first arm, extending from said base portion toward said cassette shutter, for shifting in a first direction in response to rotation of said cassette shutter toward said closed position;
- a second arm, extending from said base portion toward said spool, for blocking rotation of said spool by shifting in said first direction with said first arm;
- first and second end portions of respectively said first and second arms, having a greater width or thickness than an interval between said first and second arms, and prevented from accidental entry between said first and second arms of another spool lock member before being assembled.

* * * * *